Dec. 17, 1935.  C. C. FARMER  2,024,686

WELDED SEAM

Filed March 1, 1934

*INVENTOR*
CLYDE C. FARMER
BY *Wm. M. Cady*
*ATTORNEY*

Patented Dec. 17, 1935

2,024,686

UNITED STATES PATENT OFFICE 2,024,686

WELDED SEAM

Clyde C. Farmer, Pittsburgh, Pa., assignor to The Westinghouse Air Brake Company, Wilmerding, Pa., a corporation of Pennsylvania Application March 1, 1934, Serial No. 713,429

3 Claims. (Cl. 219—10)

This invention relates to a welded seam for sheet metal plates and the method of producing same.

In the process of forming a welded seam between the edges of a sheet metal plate or plates, the metal in the seam adjacent to the weld becomes heated due to the welding process. This is particularly undesirable in case the sheet metal being welded is cold drawn having high tensile strength, since this heating of the metal results in more or less annealing of the metal in the vicinity of the weld and a consequent reduction of tensile strength of from thirty to fifty per cent, according to the degree of annealing. In case the metal at the welded seam is no thicker than the portion of the sheets not subject to the heat from the welding process, it will be evident that when the sheets being welded are cold drawn, the seam is by far the weakest part of the structure, so that the advantage of using cold rolled sheet steel is substantially lost.

One object of my invention is to provide an improved welded seam for cold drawn sheet steel plates, in which the seam in a fully annealed state has at least the same tensile strength as that portion of the cold rolled sheet which is not heated and thus annealed, due to the welding process.

Another object of my invention resides in the method of making a welded seam of the above character.

Other objects and advantages will be apparent from the following more detailed description of the invention.

Figure 1:
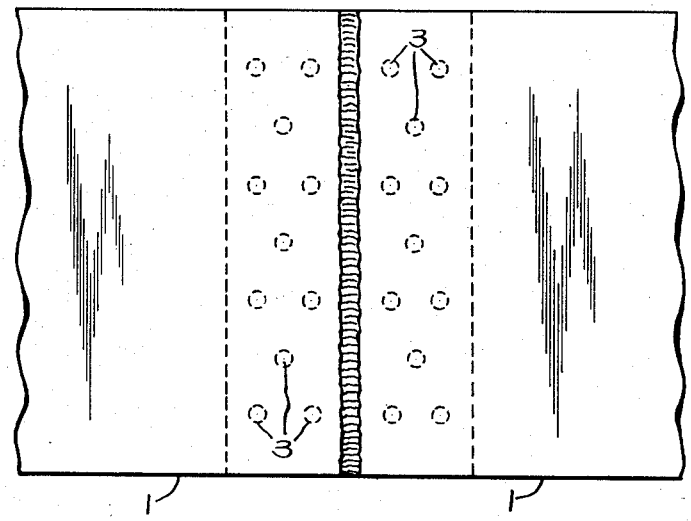
Figure 2:
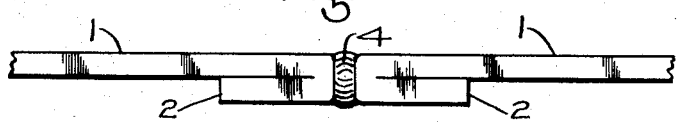
Figure 3:
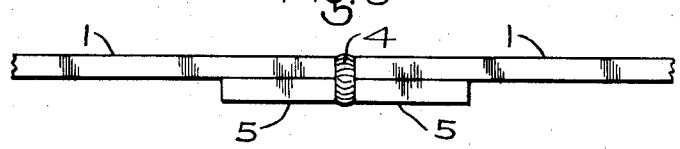
Figure 4:
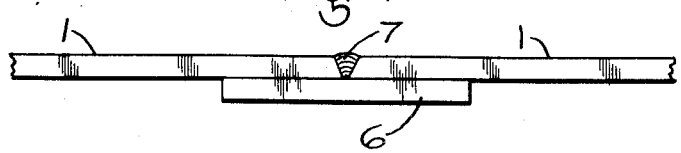

In the accompanying drawing; Fig. 1 is a plan view of a welded seam joining two pieces of metal plate and constructed in accordance with my invention; Fig. 2 is an edge view of a welded seam illustrating one method of constructing a welded seam in accordance with my invention; and Figs. 3 and 4 are views similar to Fig. 1 but illustrating other methods of constructing a welded seam in accordance with my invention.

The sheet metal plates 1 to be welded together are cold drawn sheet steel having high tensile strength, and according to the form of the invention shown in Fig. 2, the edge of each of the plates 1 is bent back forming a fold 2 which is preferably tightly pressed together, and then the two parts of the fold are welded to each other by the spot welding process, the spot welds being indicated by the dash circles 3 shown on Fig. 1. The folds 2 of the plates 1 are then joined by a seam weld 4 in any desired manner, such for instance, as the arc welding process.

The length of the folds 2 is greater than the distance that heat, sufficient to cause annealing, will travel back from the weld 4 into the plates 1 during the process of making said weld, so that the portion of the folds 2 remote from the weld 4 will not be affected by the heat in making the weld 4. The portion of the folds 2 adjacent to the weld 4 will however become more or less annealed, but due to the double thickness of this portion its strength will be at least equal to that portion of the sheets back of the folds 2.

The spot welds 3 between the two portions of the folds 2 are sufficient in number and so located as to provide a bond between said portions which has at least the same strength as a single thickness of the cold drawn and unannealed plates back of the folds 2.

The modification shown in Fig. 3 is similar to the construction shown in Fig. 2 except that the additional thickness of metal is provided on the plates 1 along the edges to be welded, by spot welding separate strips 5 of sheet steel onto the plates 1, instead of folding back the edges of the plates as shown in Fig. 2. One advantage of this modified construction is that, in case the reduction in tensile strength of plates 1 adjacent the weld 4 is for instance less than fifty per cent, then the thickness of strips 5 need only be great enough to provide for this decreased strength of plates 1, and therefore may be of less thickness than said plates, which results not only in a saving of material, but also provides a lighter weight product, which is very desirable.

In the modification shown in Fig. 4, a strip 6 of sheet metal is placed on the plates 1 so as to lap over the edges to be joined by a seam weld. This seam may be constructed in either of two ways, in that the strip 6 of sheet metal may be applied and spot welded to the plates 1 either before or after the seam weld 7 is made between the edges of the plates 1. In case the strip 6 is applied to plates 1 before the seam weld 7 is made, then said strip will become annealed in the area adjacent to the seam weld the same as the plates 1, and it will be seen that the weld 7 will be made between the edges of the plates 1 and the strip 6, so that this construction is very similar to that of Fig. 3. If, however, the strip 6 is not spot welded to the plates 1 until after the seam weld 7 is made, the strip does not become annealed due to the heat from weld 7, and consequently may be of thinner material than if applied before making weld 7 and thereby becoming subsequently annealed.

It will be understood that by making a welded seam in accordance with my invention, it is possible to attain the advantages of light weight and saving of material effected by using cold rolled sheet material having high tensile strength.

While several illustrative embodiments of my invention have been described in detail, it is not my intention to limit its scope to these embodiments or otherwise than by the terms of the appended claims.

Having now described my invention, what I claim as new and desire to secure by Letters Patent, is:

1. A welded seam joining sheet metal plates having high tensile strength and in which heating and subsequent annealing reduces the tensile strength, said seam comprising a seam weld between two adjacent edges of said plates, and reenforcing sheet metal joined to said seam weld and spot welded to said plates and extending back on said plates each side of said seam weld for a distance greater than said plates become annealed due to the process of making said seam weld.

2. A welded seam joining sheet metal plates having high tensile strength and in which heating and subsequent annealing reduces the tensile strength, said seam comprising additional sheet metal disposed on said plates each side of the edges to be joined, and a seam weld between the adjacent edges of said plates and said additional sheet metal, said additional sheet metal being secured to said plates and extending back on said plates each side of said seam weld for a distance greater than said plates become annealed due to the process of making said seam weld.

3. The method of forming a welded seam between sheet metal plates having high tensile strength and in which the tensile strength is reduced upon annealing incident to being heated in the process of welding, which consists in joining said plates at two adjacent edges by a seam weld, applying additional sheet metal to said plates which extends back on each side of said seam weld for a distance greater than said plates become annealed due to the heat from making said seam weld, and in spot welding said additional sheet material to said plates.

CLYDE C. FARMER.